Patented May 21, 1940

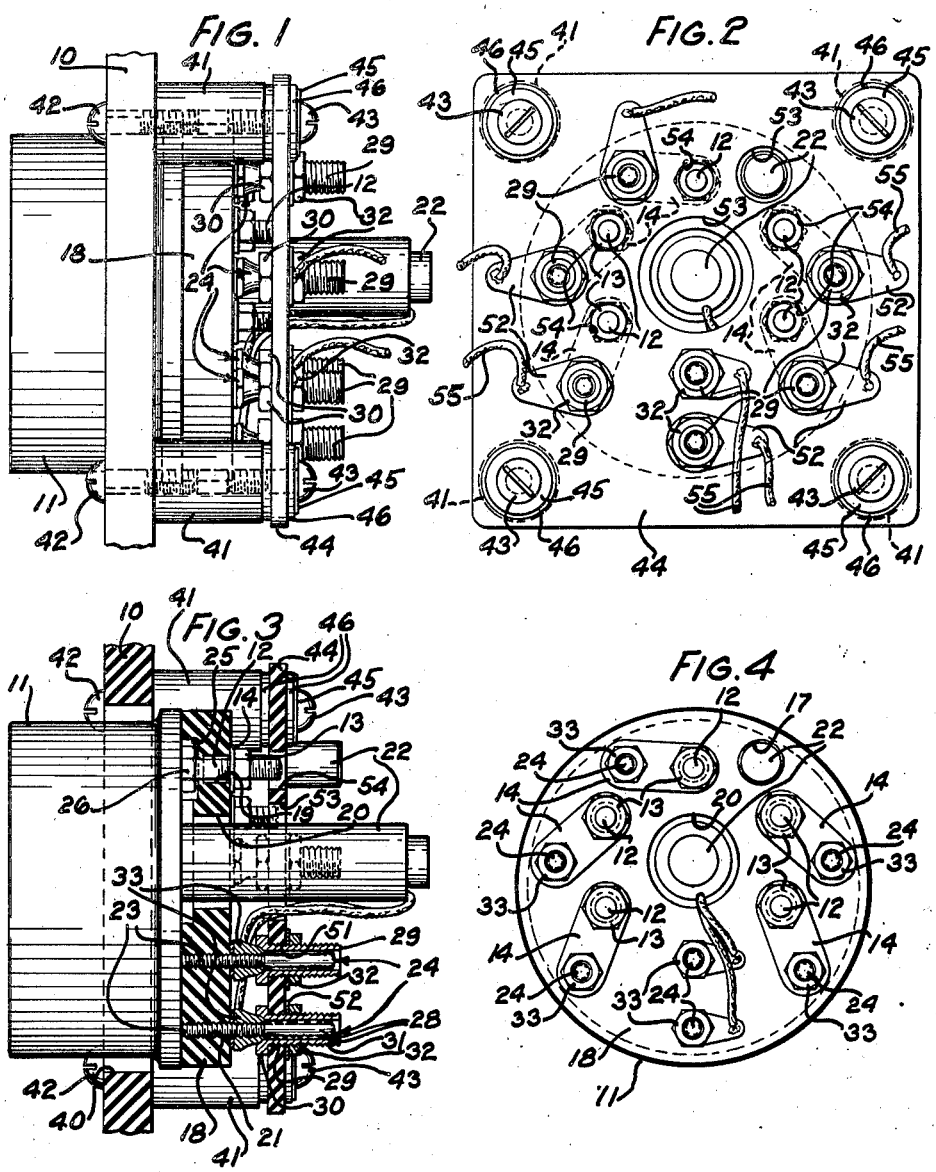

2,201,344

UNITED STATES PATENT OFFICE 2,201,344

MOUNTING DEVICE

Christian Paulson, Elmhurst, Ill., assignor to Western Electric Company, Incorporated, New York, N. Y., a corporation of New York Application February 8, 1939, Serial No. 255,255

6 Claims. (Cl. 175—222)

This invention relates to mounting devices and more particularly to an adapter for detachably mounting a meter on a panel.

It is an object of the present invention to provide a simple and inexpensive device for detachably supporting a piece of electrical apparatus on a panel.

In accordance with one embodiment of the invention, an auxiliary plate of insulating material having a plurality of jacks mounted therein is mounted on the rear of an instrument panel, being spaced therefrom. A plurality of plugs are mounted upon a plate which may be secured to the back of an instrument to be mounted on the panel, which plate is provided with apertures for receiving the terminals of the piece of apparatus to be mounted whereby it may be secured to the apparatus to be mounted and the terminals of the instrument may be connected to the plugs.

A better understanding of the invention will be had by reference to the accompanying drawing, wherein Fig. 1 is a side elevational view of a panel having a meter detachably mounted thereon by means of the apparatus comprising the present invention;

Fig. 2 is a rear elevational view of the adapter shown in Fig. 1;

Fig. 3 is a vertical sectional view taken through the center of the mounting; and Fig. 4 is a rear elevational view of the plate secured to the piece of apparatus to be mounted on the panel.

Referring to the drawing, wherein like reference characters designate the same parts throughout the several views, the numeral 10 designates a panel of an electrical apparatus on which a meter 11 is to be detachably mounted. The meter 11 may be of any well-known type, which is provided with a plurality of terminals 12 of the type having screw threads formed thereon for receiving nuts 13 and washers 14, whereby a conductor may be connected to the instrument.

A relatively thick plate 18 of insulating material, of slightly smaller size than the base plate of the instrument 11, has a series of apertures 17, 19, 20 and 21 formed therein for receiving extending portions of the terminals 12, extending portions 22 of the instrument, and the threaded ends 23 of a group of plugs, designated generally by the numeral 24. The apertures 19 have enlarged portions 25 in which nuts 26, which fasten the terminals 12 to the instrument, may nest.

In former practice, the nuts 13 served the dual purpose of attaching the instrument 11 to a mounting panel and securing the terminal end of a conductor to the terminal 12. In the present invention, the nuts 13 hold the insulating plate 18 on the instrument 11. The washer 14, which is used in the present case, is provided with two holes and, in addition to serving as a washer, also serves to connect the threaded terminals 12 of the instrument 11 to the plugs 24 and may be seen by reference to Fig. 4. The particular adapter and mounting plate chosen for illustration are adapted for use on a meter of the type having magnetized contacts and solenoid actuated mechanism for breaking the indicator of the instrument away from the magnetized contacts. This particular mechanism forms no part of the present invention, except insofar as the adapter is shown for cooperation with such a device.

Each of the plugs 24 has a threaded shank 23, to the unthreaded end of which there are fixed two light springs 28, which are bent down along the shank 23 of the plug, and which tend to spread out umbrella fashion from the shank of the plug, whereby the plug will grippingly engage a jack designed to receive it. Such a jack, as clearly shown in section in Fig. 3, comprises a tubular member 29 having a shoulder 30 and a threaded portion 31, which may be secured to a supporting plate by means of a nut 32. The plug 24 is also provided with a threaded, shouldered locking member 33, whereby it may be securely locked on the plate 18.

In accordance with the preferred form of the invention, the instrument panel 10 has an aperture 40 formed therein of slightly larger size and of the same configuration as the base of the instrument to be mounted and a series of spacers 41 are secured to the panel 10 by means of machine screws 42. The spacers 41 are threaded to receive the screws 42 and are also threaded to receive machine screws 43 for fixing an adapter plate 44 to the panel 10 in spaced relation thereto. Metallic washers 45 are placed directly beneath the heads of the machine screws 43 and soft rubber bushings or grommets 46 are mounted in the adapter plate 44 to resiliently support the adapter plate 44 between the heads of the screws 43 and the spacers 41. The adapter plate 44 has a series of apertures 53 therein to receive the extending portions 22 of the instrument and has a series of apertures 51 in which the threaded portions 31 of the jacks may be mounted. A third series of apertures 54 are formed in the adapter plate to accommodate the extending ends of the terminals 12. The nuts 32, which secure the jacks on the adapter plate 44, may also be utilized to connect terminals 52 electrically to the jacks and these terminals may be suitably connected to the conductors 55, which connect the instrument to its controlling circuits. It will be noted that the centrally located extending portion 22 has a pair of wires extending from it to a pair of plugs 24. These wires are passed through the central aperture 53 for connection to the plugs.

Although a specific embodiment of the invention has been described hereinbefore, it will be understood that many modifications may be made without departing from the scope of the invention, which is to be limited only by the scope of the appended claims.

What is claimed is:

1. An adapter for removably supporting instruments on panels comprising a mounting plate fixed to the instrument, a plurality of plugs fixed to said mounting plate and connected to the terminals of the instrument, an adapter plate mounted on said panel and spaced rearwardly therefrom, and a plurality of jacks mounted on said panel for cooperation with said plugs and having the terminal ends of conductors connected thereto.

2. An adapter for removably mounting instruments on panels comprising a plate secured to the rear of the instrument, a plurality of plugs fixed to the plate, an adapter plate mounted in spaced relation to the panel, and a plurality of jacks mounted in said adapter plate to receive the plugs, said plugs and jacks constituting the sole means for supporting the plate on the adapter plate.

3. An adapter for removably supporting instruments on panels comprising a plate having apertures positioned therein to receive the terminal mounting screws of the instrument, a plurality of plugs mounted on said plate, electrical connections between the terminal mounting screws and the plugs, an adapter plate mounted on said panel, and a plurality of jacks mounted in said adapter plate for receiving said plugs, said plugs and jacks comprising the only means for supporting the plate on the adapter plate.

4. An adapter for removably supporting instruments on panels having apertures therein slightly larger than and conforming to the shape of the instruments for receiving the instruments, an adapter plate mounted on the panel and spaced therefrom, said adapter plate being positioned back of said aperture, a plurality of jacks mounted in said adapter plate and connected to the terminal ends of conductors, a plate fixed to the instrument by the terminals thereof, a plurality of plugs mounted on said last-mentioned plate for cooperation with the jacks in the adapter plate, and a plurality of connectors interconnecting the terminals of the instrument and said plugs.

5. An adapter for removably supporting instruments on panels, having apertures therein slightly larger than and conforming to the shape of the instruments for receiving the instruments, an adapter plate mounted on the panel and spaced therefrom, said adapter plate being positioned back of said aperture, a plurality of jacks mounted in said adapter plate and connected to the terminal ends of conductors, a plate fixed to the instrument by the terminals thereof, a plurality of plugs mounted on said last mentioned plate for cooperation with the jacks in the adapter plate, and a plurality of connectors interconnecting the terminals of the instrument and said plugs, said plugs being positioned farther from the center of the plate fixed to the instrument than the terminals of the instrument.

6. An adapter for removably supporting instruments on panels, having apertures therein slightly larger than and conforming to the shape of the instruments for receiving the instruments, an adapter plate mounted on the panel and spaced therefrom, said adapter plate being positioned back of said aperture, a plurality of jacks mounted in said adapter plate and connected to the terminal ends of conductors, a plate fixed to the instrument by the terminals thereof, a plurality of plugs mounted on said last mentioned plate for cooperation with the jacks in the adapter plate, and a plurality of connectors interconnecting the terminals of the instrument and said plugs, a substantial number of said plugs being mounted equidistant from the center of the instrument and farther from the center than the terminals.

CHRISTIAN PAULSON.